3,344,029
SUSTAINED RELEASE COMPOSITION
Howard H. Berger, Great Neck, N.Y., assignor to U.S. Ethicals, Inc., Long Island City, N.Y., a corporation of New York
No Drawing. Filed June 3, 1963, Ser. No. 284,827
6 Claims. (Cl. 167—82)

This invention relates to a sustained action therapeutic preparation for oral administration. More particularly, the invention relates to a sustained action therapeutic preparation for oral administration in which the therapeutic material in finely divided form is intimately and cohesively admixed with an ingestible material resistant to disintegration in the gastro-intestinal tract.

Sustained action therapeutic preparations for oral administration are old in the art and are widely produced. In general they are of two types, i.e., those having a therapeutically active core coated with varying thicknesses of ingestible material and those having an inocuous core coated with varying numbers of coatings of therapeutically active material alternating with coatings of ingestible material. Each of these types suffers from a serious disadvantage in that if accidentally crushed in the mouth, the therapeutically active material free of its protective coating of ingestible material is exposed to alimentary canal fluids resulting in a relatively rapid release of the full dosage of therapeutically acitve material. Such a rapid release in addition to wastage of the therapeutically active material can in many instances result in shock to the system with harmful effects.

My invention provides a sustained action therapeutic preparation for oral administration free from this disadvantage in that less than the full dosage of therapeutically active material is exposed to alimentary canal fluids in case of accidental crushing in the mouth. The sustained action therapeutic preparation of my invention is a dosage unit in capsule or tablet form containing a plurality of resilient cores each consisting essentially of a cohesive intimate admixture of a finely divided therapeutically active material and an ingestible material resistant to disintegration in the gastro-intestinal tract. The proportion of ingestible material to therapeutically active material in each core varies from about 0.1 to 2.0:1 with some variation among the cores to provide varying release rates in the gastro-intestinal tract. In addition, at least a minor proportion of the cores are coated with alternating coatings of therapeutically active material and ingestible material and the proportion of therapeutically active material and ingestible material in the cores and the amount of therapeutically active material in the sum of the coatings is so correlated that the percent of therapeutically active material in the coatings plus the percent of therapeutically active material in the cores released during the first hour in the gastro-intestinal tract is less than 50% of the total therapeutically active content of the dosage unit. Although the therapeutically active material in the coatings is immediately exposed to alimentary canal fluids upon accidental crushing, more than 50% of the therapeutically active material in the cores intimately and cohesively admixed with the ingestible material is not so exposed and is released at a later safe time after being swallowed.

In addition to being more safe and efficient than presently available sustained action therapeutic preparations, the dosage units of my invention can be prepared such that the release of therapeutically active material is more evenly distributed over a given time period. For example, by varying the proportion of cores formed from varying proportions of therapeutically active material and ingestible material and indeed varying the ingestible material used, the release rate of the therapeutically active material can be closely controlled. Further control is obtained by varying the proportions of therapeutically active material in the cores and in the coatings, varying the number of coatings, and varying the thickness of or number of ingestible material coatings.

The therapeutically active materials useful in the dosage units of my invention are in general those which are normally administered orally and which are administered in relatively exact dosages. They include antibiotics such as penicillin, tetracycline, Terramycin, Aureomycin and Chloromycetin; sedatives and hypnotics such as pentabarbital sodium, phenobarbital, butabarbital, amobarbital, secobarbital sodium, codeine, Bromisovalum, cabromal and sodium phenobarbital; hypotensives and vasodilators such as pentaerythritol and erythrityl tetranitrate and nitroglycerin; amphetamines such as dl amphetamine sulfate and dextroamphetamine sulfate; hormones such as dienestrol, ethynyl estradiol, diethylstilbestrol, methyltestosterone and progesterone; cortisone; vitamins; and tranquilizers such as reserpine, chlorpromazine hydrochloride and thipropazate hydrochloride, prednisolone; pentylene tetrazole, N-acetyl p-amino phenol, alkaloids of belladonna, atropine sulfate, hyoscine hydrobromide, hyoscyamine $SO_4$, chlorpheniramine maleate, phenylephedrine, quinidine salts, theophylline salts, ephedrine salts, pyrilamine maleate, quaiacol-glyceryl-ether-theophyllinate.

The ingestible materials useful in the dosage units of my invention are those conventionally employed and include methyl and ethyl cellulose, cellulose acetate and phthalate, shellac, castor oil and hydrogenated castor oil, waxes such as beeswax, carnauba wax, candelilla wax, Japan wax, paraffin, bayberry wax, higher fatty acids, such as oleic acid, palmitic acid and stearic acid, esters of such higher fatty acids such as glyceryl tristearate, cetyl palmitate, diglycol stearate, glyceryl myristate, triethylene glycol monostearate, higher fatty alcohols such as cetyl alcohol and stearyl alcohol, and high molecular weight polyethylene glycols such as the carbowaxes, polyethylene glycol monostearate, polyethylene glycol distearate, polyoxyethylene stearate, glyceryl monostearates and mixtures thereof. The ingestible material is selected or compounded to provide a core which is resilient and plastic in consistency. For example, it is well known that the celluloses and shellac form films, the waxes and castor oil impart plasticity and elasticity to such films, and the higher fatty acids and their derivatives are plasticizing and dispersing agents. The ingestible material can be further selected or compounded to provide varying release rates in the gastro-intestinal tract for various batches of cores. The ingestible material is ordinarily intimately admixed with the finely divided therapeutically active material while the former is at least partially dissolved in an organic solvent such as methyl alcohol, isopropyl alcohol, carbon tetrachloride, chloroform, or acetone.

Preparation of dosage units falling within the scope of my invention is illustrated in detail by the following examples.

*Example I*

The therapeutically active material employed in this example was phenylpropanolamine hydrochloride and it will be referred to as the active material.

In the first step, 47.6 pounds of finely divided active material was intimately admixed with 23.8 pounds of powdered sugar and 5 pounds of finely divided corn starch. This dry mixture was homogeneously intermixed with one-half gallon of a pharmaceutical glaze-castor oil mixture formed from 8 pounds of pharmaceutical glaze (5 pounds of shellac per gallon of methyl alcohol) and 10 ounces of castor oil. It was necessary to add a small amount of alcohol to obtain a better dispersion. This damp mixture was then placed upon flat trays and allowed to dry using warm air. After the mass became partly dry, it was pressed through a 16 mesh screen to obtain small cores. These cores were again dried.

In the second step, another 47.6 pounds of finely divided active material was intimately admixed with 23.8 pounds of powdered sugar and 5 pounds of finely divided corn starch. This dry mixture was homogeneously intermixed with a liquid mixture of 8 pounds of pharmaceutical glaze (5 pounds of shellac per gallon of methyl alcohol), 10.4 pounds of hydrogenated castor oil and 4 pounds of a polyethylene glycol having an average molecular weight of 4000. Enough alcohol was sprinkled on the mixture to dampen same. After partial drying the mixture was pressed through a 16 mesh screen to obtain small cores which were dried.

Step two was repeated three more times using in each instance an increased amount of hydrogenated castor oil, i.e. in step 3 11.9 pounds, in step 4 13.4 pounds, and in step 5 14.9 pounds, the other ingredients and amounts being the same. In order to form an intimate admixture of the dry materials when using increased amounts of hydrogenated castor oil, the castor oil and polyethylene glycol were first heated to a temperature of about 154° F., the dry mixture was added thereto and admixed, and then the pharmaceutical glaze was added. This mixture was poured on trays and allowed to cool and solidify before being forced through a 16 mesh screen.

The cores obtained by steps 1–5 were assayed to check their average disintegration rate which was found to be as follows:

| After: | Release of medication, percent |
| --- | --- |
| 1 hour | 14 |
| 2–5 hours | 24 |
| 5–6 hours | 6 |
| 6–8 hours | 12 |
| 8–10 hours | 12 |

The cores obtained by steps 1–5 were then intermixed in a pony mixer to obtain an average disintegration rate and were then placed in a 40 inch coating pan and coated with a number of coatings of corn syrup to provide spherical cores.

The final dosage unit of this example was to have a release rate approximately as follows:

| After: | Release of medication, percent |
| --- | --- |
| 1 hour | 14 |
| 2–3 hours | 14 |
| 3–4 hours | 14 |
| 4–5 hours | 14 |
| 5–6 hours | 14 |
| Each of 6–10 hours | 6 |

A comparison of the above release rates with those presented for the cores obtained by steps 1–5 indicates that additional therapeutically active material must be added to provide release of an additional 8% of the total medication in the final dosage unit in each of hours 2–5 or a total of 32% of the total medication amounting to 112 pounds. The cores obtained by steps 1–5 would then contain 68% of the active material in the final dosage unit. Four-tenths of the total spherical, syrup-coated cores obtained by steps 1–5 were separated and coated with alternating layers of active material and ingestible material to provide release of 8% of active material after each one hour period for four hours.

Thus in step 6, the four-tenths of total cores weighing about 183 pounds were placed into a coating pan, moistened with a solution of pharmaceutical glaze and alcohol, dusted with 28 pounds of active material, and dried to achieve complete evaporation of solvents. After drying, the dusted cores were coated with pharmaceutical glaze and tumbled in the coating pan by applying warm air to dry the coating. Nine additional coatings of pharmaceutical glaze were applied in a similar manner to provide a delayed action in the gastro-intestinal tract of about one hour.

In step 7, one-fourth of the coated cores were removed from the pan and the remaining cores were moistened with a solution of pharmaceutical glaze and alcohol, dusted with another 28 pounds of active material, and dried to achieve complete evaporation of solvents. After drying, the dusted cores were coated with the solution of pharmaceutical glaze and tumbled in the coating pan by applying warm air to dry the coating. Nine additonal coatings of pharmaceutical glaze were applied in a similar manner to provide a delayed action of about one hour.

In step 8, one-third of the coated cores were removed from the pan and the above procedure was repeated, using another 28 pounds of active material to dust the cores, and applying another ten coatings of pharmaceutical glaze.

In step 9, one-half of the coated cores were removed from the pan and the above procedure was repeated, using another 28 pounds of active material to dust the cores, and applying another ten coatings of pharmaceutical glaze.

The six-tenths of the original cores obtained by steps 1–5 and the coated cores obtained by steps 6–9 were then carefully intermixed in a pony mixer and assayed for average rate of release of medication which was found to be as follows:

|  | In Core, Percent | In Coatings, Percent | Total, Percent |
| --- | --- | --- | --- |
| After 1 hour | 14 |  | 14 |
| 1–2 hours | 6 | 8 | 14 |
| 2–3 hours | 6 | 8 | 14 |
| 3–4 hours | 6 | 8 | 14 |
| 4–5 hours | 6 | 8 | 14 |
| Each of 5–10 hours | 6 |  | 6 |
|  | 68 | 32 | 100 |

In case of accidental crushing, the rate of release of medication was found to be 46% after one hour, from the 14% in the cores and the 32% in the coatings, and 6% during each additional hour through 10 hours. A safe amount of medication is hence released in case of accidental crushing and the medication is not wasted. The intermixed cores were then placed in gelatin capsules in calculated amounts to provide the dosage units of my invention.

*Example II*

The therapeutically active material employed in this example was nitroglycerin.

In the first step, 5.4 pounds of a powder containing 10% by weight of nitroglycerine and 90% by weight of beta-lactose was mixed with 28 pounds of a mixture of cane and corn sugars and this dry mixture was homogeneously intermixed with ¼ gallon of a pharmaceutical glaze-castor oil mixture formed from 8 pounds of pharmaceutical glaze (5 pounds of shellac per gallon of methyl alcohol) and 10 ounces of castor oil. This damp mixture was then placed on flat trays to dry using warm air. After the mass became partly dry, it was pressed through a 16 mesh screen to obtain small cores which were then dried.

In the second through fifth steps, the same amount of dry mixture as in step one was used, i.e. 5.4 pounds of a powder containing 10% by weight of nitroglycerine and 90% by weight of beta-lactose admixed with 23 pounds of powdered sugar and 5 pounds of corn sugar. The same ingestible materials and procedures were used as in steps 2–5 of Example I but in different amounts as follows:

|  | Step 2 | | Step 3 | | Step 4 | | Step 5 | |
|---|---|---|---|---|---|---|---|---|
|  | Lbs. | Ozs. | Lbs. | Ozs. | Lbs. | Ozs. | Lbs. | Ozs. |
| Pharmaceutical glaze | 2 | 6 | 2 | 10 | 2 | 14 | 3 | 4 |
| Hydrogenated castor oil |  | 14 | 1 | 6 | 1 | 12 | 1 | 14 |
| Polyethylene glycol |  | 14 |  | 10 |  | 7 |  | 6 |

The cores obtained by steps 1–5 were assayed to check their average disintegration rate which was found to be as follows:

After:             Release of medication, percent
1 hour _____ 14
2–5 hours _____ 24
5–6 hours _____ 6
6–8 hours _____ 12
8–10 hours _____ 12

The cores obtained by steps 1–5 were then intermixed in a pony mixer to obtain an average disintegration rate and were then placed in a 40 inch coating pan and coated with a number of coatings of syrup to provide spherical cores containing 2.72 pounds of nitroglycerine.

The final dosage unit of this example was to have a release rate approximately as follows:

After:             Release of medication, percent
1 hour _____ 14
1–2 hours _____ 14
2–3 hours _____ 13
3–4 hours _____ 12
4–5 hours _____ 11
5–6 hours _____ 9
6–7 hours _____ 8
7–8 hours _____ 7
8–9 hours _____ 6
9–10 hours _____ 6

A comparison of the above release rates with those presented for the cores obtained by steps 1–5 indicates that additional therapeutically active material must be added to provide release of 32% of the total medication in the final dosage unit during the second through the eighth hours in decreasing amounts. The cores obtained by steps 1–5 would then contain 68% of active material in the final dosage unit. Seven-tenths of the total spherical, syrup-coated cores obtained by steps 1–5 were separated and coated with alternating layers of active material and ingestible material to provide release of 32% of the active material, or an additional 1.28 pounds, in the final dosage unit in decreasing amounts.

Thus in step 6, the seven-tenths of total cores weighing about 134 pounds were placed into a coating pan and moistened with a solution of pharmaceutical glaze and alcohol. One-seventh of the additional active material, i.e. 1.83 pounds of the 10% nitroglycerin-beta lactose mixture was then applied to the seven-tenths of separated cores in five coatings alternating with coatings of pharmaceutical glaze. Five additional coatings of pharmaceutical glaze were applied to produce a delayed release effect. The procedure was similar to that described in step 6 of Example I, i.e. the powder was applied in dry form, the intermittent coatings of pharmaceutical glaze were completely dried before the next dusting, and warm air was used for drying.

In step 7, one-seventh of the coated cores were removed from the pan and the above procedure repeated, using another 1.83 pounds of the 10% nitroglycerine-beta lactose mixture applied in five coatings alternating with coatings of pharmaceutical glaze and with five additional coatings of pharmaceutical glaze applied.

In each of steps 8 through 12, the procedure of step 7 was repeated with one-sixth of the coated cores being removed after step 7, one-fifth after step 8, one-fourth after step 9, one-third after step 10, and one-half after step 11.

The three-tenths of the original cores obtained by steps 1–5 and the coated cores obtained by steps 6–12 were then carefully intermixed in a pony mixer and assayed for average rate of release of medication which was found to be as follows:

|  | In Core, Percent | In Coatings, Percent | Total, Percent |
|---|---|---|---|
| After 1 hour | 14 |  | 14 |
| 1–2 hours | 6 | 8 | 14 |
| 2–3 hours | 6 | 7 | 13 |
| 3–4 hours | 6 | 6 | 12 |
| 4–5 hours | 6 | 5 | 11 |
| 5–6 hours | 6 | 3 | 9 |
| 6–7 hours | 6 | 2 | 8 |
| 7–8 hours | 6 | 1 | 7 |
| 8–9 hours | 6 |  | 6 |
| 9–10 hours | 6 |  | 6 |
|  | 68 | 32 | 100 |

In case of accidental crushing, the rate of release of medication was found to be 46% after one hour, from the 14% in the cores and the 32% in the coatings, and 6% during each additional hour through 10 hours. The intermixed cores were then admixed in calculated amounts with a powder consisting of starch and sugar to provide tabletted dosage units of my invention.

Manufacture of the cores used to form the dosage units of my invention is subject to variation depending upon the release rate desired for the particular medication. Thus the amount of therapeutically active material can be varied in preparing the cores as can the type and proportions of ingestible material. The amount of therapeutically active material in the cores can vary from about 50 to about 95% by weight of the therapeutically active material in the final dosage unit. Hence the amount of therapeutically active material in the coatings can vary from about 5 to somewhat less than 50% by weight of the therapeutically active material in the final dosage unit. Also, the types and proportions of ingestible material used in forming the coatings can be varied. The proportions of therapeutically active material and ingestible material in the cores and the amount of therapeutically active material in the coatings must be so correlated that the percent of therapeutically active material in the coatings plus the percent of therapeutically active material in the cores released during the first hour in the gastro-intestinal tract is less than 50% of the total therapeutically active material in the dosage unit. Thus, in dosage units designed for a 10 hour sustained release of medication, for example, the cores can be prepared to release 0 to about 45% of the total therapeutically active material in the dosage unit in the first hour and about 2 to 20% of the total therapeutically active material in each of the next nine hours. Additional examples of correlation of core and coating release rates are shown in the following table. Although in the examples the therapeutically active material used to form the coatings was dusted on, it can be sprayed on in the conventional manner.

TABLE I

|  | Example III, percent | | Example IV, percent | | Example V, percent | | Example VI, percent | |
| --- | --- | --- | --- | --- | --- | --- | --- | --- |
|  | In Core | In Coating | In Core | In Coating | In Core | In Coating | In Core | In Coating |
| After 1 hour | 16 | -------- | 14 | -------- | -------- | -------- | -------- | -------- |
| 1-2 hours | 6 | 8 | 6 | 4 | 8 | 8 | 7 | 4 |
| 2-3 hours | 6 | 6 | 6 | 4 | 8 | 7 | 7 | 4 |
| 3-4 hours | 6 | 4 | 6 | 4 | 8 | 6 | 7 | 8 |
| 4-5 hours | 6 | 2 | 6 | 8 | 8 | 4 | 7 | 8 |
| 5-6 hours | 8 | -------- | 6 | 4 | 8 | 2 | 8 | 4 |
| 6-7 hours | 8 | -------- | 6 | 4 | 8 | 1 | 8 | 4 |
| 7-8 hours | 8 | -------- | 6 | 4 | 8 | -------- | 8 | -------- |
| 8-9 hours | 8 | -------- | 6 | -------- | 8 | -------- | 8 | -------- |
| 9-10 hours | 8 | -------- | 6 | -------- | 8 | -------- | 8 | -------- |
|  | 80 | 20 | 68 | 32 | 72 | 28 | 68 | 32 |

|  | Normal Release, percent | Accidental Release, percent | Normal Release, percent | Accidental Release, percent | Normal Release, percent | Accidental Release, percent | Normal Release, percent | Accidental Release, percent |
| --- | --- | --- | --- | --- | --- | --- | --- | --- |
| After 1 hour | 16 | 36 | 14 | 46 | 0 | 28 | 0 | 32 |
| 1-2 hours | 14 | 6 | 10 | 6 | 16 | 8 | 11 | 7 |
| 2-3 hours | 12 | 6 | 10 | 6 | 15 | 8 | 11 | 7 |
| 3-4 hours | 10 | 6 | 10 | 6 | 14 | 8 | 15 | 7 |
| 4-5 hours | 8 | 6 | 14 | 6 | 12 | 8 | 15 | 7 |
| 5-6 hours | 8 | 8 | 10 | 6 | 10 | 8 | 12 | 8 |
| 6-7 hours | 8 | 8 | 10 | 6 | 9 | 8 | 12 | 8 |
| 7-8 hours | 8 | 8 | 10 | 6 | 8 | 8 | 8 | 8 |
| 8-9 hours | 8 | 8 | 6 | 6 | 8 | 8 | 8 | 8 |
| 9-10 hours | 8 | 8 | 6 | 6 | 8 | 8 | 8 | 8 |

*Example VII*

The therapeutically active material employed in this example was quinidine sulfate. The procedures and amounts of materials were the same as in Example I except that quinidine sulfate was substituted for phenylpropanolamine hydrochloride.

I claim:

1. A sustained action therapeutic preparation comprising a dosage unit containing a plurality of resilient cores each consisting essentially of a cohesive intimate admixture of a finely divided therapeutically active material in powder form and an ingestible material resistant to disintegration in the gastro-intestinal tract, the proportion of ingestible material to therapeutically active material in each core varying from 0.1 to 2.0:1 and there being some variation in proportion among the cores to provide varying release rates in the gastro-intestinal tract, at least a minor proportion of the cores being coated, the coated cores having alternating coatings of therapeutically active material and ingestible material, and the proportion of therapeutically active material and ingestible material in the cores and the amount of therapeutically active material in the sum of the coatings being so correlated that the percent of therapeutically active material in the coatings plus the percent of therapeutically active material in the cores released during the first hour in the gastro-intestinal tract in the event of accidental crushing during oral administration is less than 50% of the total therapeutically active content of the dosage unit.

2. The sustained action therapeutic preparation of claim 1 wherein the percent of therapeutically active material in the cores released during the first hour is between 0 and 20 percent of the total therapeutically active content of the dosage unit.

3. The sustained action therapeutic preparation of claim 2 wherein the percent of therapeutically active material in the coatings is 20 to 35% of the total therapeutically active content of the dosage unit.

4. The sustained action therapeutic preparation of claim 1 wherein the therapeutically active material is nitroglycerin.

5. The sustained action therapeutic preparation of claim 1 wherein the therapeutically active material is phenylpropanolamine hydrochloride.

6. The sustained action therapeutic preparation of claim 1 wherein the therapeutically active material is quinidine sulfate.

References Cited

UNITED STATES PATENTS

| | | | |
| --- | --- | --- | --- |
| 2,853,420 | 9/1958 | Lowey | 167—82 |
| 3,078,216 | 2/1963 | Grief | 167—82 |
| 3,108,046 | 10/1963 | Harbit | 167—82.9 |
| 3,115,441 | 12/1963 | Hermelin | 167—82.9 |

OTHER REFERENCES

Stecher et al., "The Merck Index," 7th Ed., 1960, pp. 805, 887–888.

ALBERT T. MEYERS, *Primary Examiner*.

F. CACCIAPAGLION, SAM ROSEN, JULIAN S. LEVITT, *Examiners*.

GEORGE A. MENTIS, *Assistant Examiner*.